United States Patent [19]

Ares et al.

[11] Patent Number: 4,522,037
[45] Date of Patent: Jun. 11, 1985

[54] REFRIGERATION SYSTEM WITH SURGE RECEIVER AND SATURATED GAS DEFROST

[75] Inventors: Roland A. Ares; Steven J. Burpo, both of St. Charles; Wayne G. Schaeffer, Creve Coeur, all of Mo.

[73] Assignee: Hussmann Corporation, Bridgeton, Mo.

[21] Appl. No.: 448,269

[22] Filed: Dec. 9, 1982

[51] Int. Cl.$^3$ ............................................. F25B 41/04
[52] U.S. Cl. ................................... 62/196.4; 62/278; 62/509; 62/234
[58] Field of Search ................ 62/81, 196.4, 278, 509, 62/199, 200, 155, 152, 234, 174

[56] References Cited
U.S. PATENT DOCUMENTS

| | | | |
|---|---|---|---|
| 3,358,469 | 12/1967 | Quick | 62/196.4 |
| 3,427,819 | 2/1969 | Seghetti | 62/278 X |
| 3,645,109 | 2/1972 | Quick | 62/196.4 |
| 4,012,921 | 3/1977 | Willitts et al. | 62/509 X |
| 4,167,102 | 9/1979 | Willitts | 62/509 X |
| 4,193,781 | 3/1980 | Vogel et al. | 62/81 |
| 4,231,229 | 11/1980 | Willitts | 62/509 X |

*Primary Examiner*—Harry Tanner
*Attorney, Agent, or Firm*—Richard G. Heywood

[57] ABSTRACT

A refrigeration system having compressor, condenser, surge receiver and multiple evaporator means, and high side control means including gas defrost means for selectively defrosting the evaporator means with saturated refrigerant gas, a surge control valve for the surge receiver means, and other means for operating the surge control valve in response to differential high side pressures, liquid levels in the receiver means and/or gas defrost operations to regulate refrigerant pressures within the surge receiver means.

36 Claims, 4 Drawing Figures

REFRIGERATION SYSTEM WITH SURGE RECEIVER AND SATURATED GAS DEFROST

BACKGROUND OF THE INVENTION

The invention relates generally to the commercial and industrial refrigeration art, and more particularly to surge receiver and gas defrost systems and high side pressure controls for such systems.

In the past, closed refrigeration systems having a single compressor or plural compressors have been used in commercial installations, such as supermarkets having a large number of different low and/or normal temperature refrigerated fixtures or units for the display and storage of products, or for industrial installations such as warehousing, lockers, manufacturing plants and the like having varying refrigeration requirements. Hot gas defrosting in such systems is well-known and effective due to the large latent heat load extracted from such products in the refrigerated units in excess of the heat required for defrosting one or more selected evaporator coils during the continued refrigeration of the remaining fixtures. However, highly superheated hot gas taken directly from the compressor discharge for defrosting selected evaporators has resulted in several adverse conditions, including breakage and leaks caused by the rapid thermal expansion and contraction of refrigerant lines and other components, and the fog or steam caused by the excessive defrost temperatures frequently is visual in the refrigerated fixture or zone and often results in the buildup of frost on the products.

U.S. Pat. No. 3,343,375 teaches that the adverse effects of prior hot gas defrosting can be obviated by using refrigerant gas at substantially saturation temperature as when taken from the receiver or otherwise desuperheated, and some benefits of surge receiver systems employing so-called saturated gas defrost are disclosed in U.S. Pat. Nos. 3,358,469 and 3,427,819, which also show high side head pressure and equalizer controls. However, although the advantages and benefits of using these separate features are recognized in these and other prior art patents, none of these prior systems has successfully utilized saturated gas defrost in combination with surge receiver systems or provided functional high side controls that make such a combination practical and economically sound. It is recognized that refrigeration system operations throughout the year are directly affected by various climatic conditions. For instance, during winter operations the maintenance of proper compressor head pressures in the high side of the system has been a principal problem, particularly in recent years in which heat reclamation condensers have come into wide-spread usage; and during summer operations in which the machine room temperature was frequently below the condensing temperature of a roof-mounted or outside condenser, the supply of saturated gas for defrosting was severely limited or substantially non-existent due to its condensation to liquid form and overfilling of the receiver.

In short, prior systems having surge receivers and utilizing saturated gas defrost and winter heat reclamation condensers have had various high side control problems in the various climatic seasons adversely affecting such systems and, while various control arrangements have been proposed, year-round system operations have not been efficient or adequately controlled heretofore.

SUMMARY OF THE INVENTION

The invention is embodied in a refrigeration system having multiple compressors, condenser, surge receiver and multiple evaporators for fixture or zone cooling, and saturated gas defrost means for selectively defrosting such evaporators, surge control valve means for the surge receiver and being responsive to other means for operation in response to predetermined liquid levels and/or defrost operations to regulate refrigerant pressures and flow within the surge receiver.

The principal object of the present invention is to provide improvements in saturated gas defrost systems in combination with surge receiving and winter heat reclamation.

Another object is to provide an improved refrigeration system with high side control means that obtain the optimum benefits and advantages of saturated gas defrosting and surge receiving in year-round system operations.

Another object of the present invention is to provide a surge receiver control system for regulating liquid head pressures and being responsive primarily to liquid levels in the surge receiver.

Another object is to provide a refrigeration system high side control arrangement that will permit the compressor head pressure to vary widely while maintaining an operation balance in system pressures relative thereto.

Another object is to provide for predetermined surge receiver gas and pressure make-up in response to receiver liquid levels and receiver gas defrost operations.

These and still other objects and advantages will become more apparent hereinafter.

DESCRIPTION OF THE DRAWINGS

For illustration and disclosure purposes the invention is embodied in the parts and the combinations and arrangements of parts hereinafter described and claimed. In the accompanying drawings which form a part of the specification and in which like numerals refer to like parts wherever they occur:

DESCRIPTION OF THE PREFERRED EMBODIMENTS

For purposes of disclosure, a closed refrigeration system embodying the invention has been illustrated and will be described as being of the multiplexed type having dual or twin parallel compressors and which might be installed in a supermarket for operating a plurality of separate fixtures, such as refrigerated storage and display cases, but it will be understood and readily apparent to those skilled in the art that such a system may have other numbers and arrangements of compressors and may be adapted to other commercial or industrial installations. The term "high side" is used herein in a conventional refrigeration sense to mean the portion of the system from the compressor discharge to the evaporator expansion valves, and the term "low side"

means the portion of the system from the expansion valves to the compressor suction. The terms "saturated gas" or "saturated gas defrost" or the like as used herein means a defrost arrangement utilizing refrigerant gas taken from the high side for use as the defrosting medium for the evaporators, and which refrigerant gas has had at least some or all of the compressor superheat removed but retains substantially all of the sensible or latent heat load for effective evaporator defrosting.

Figure 1:
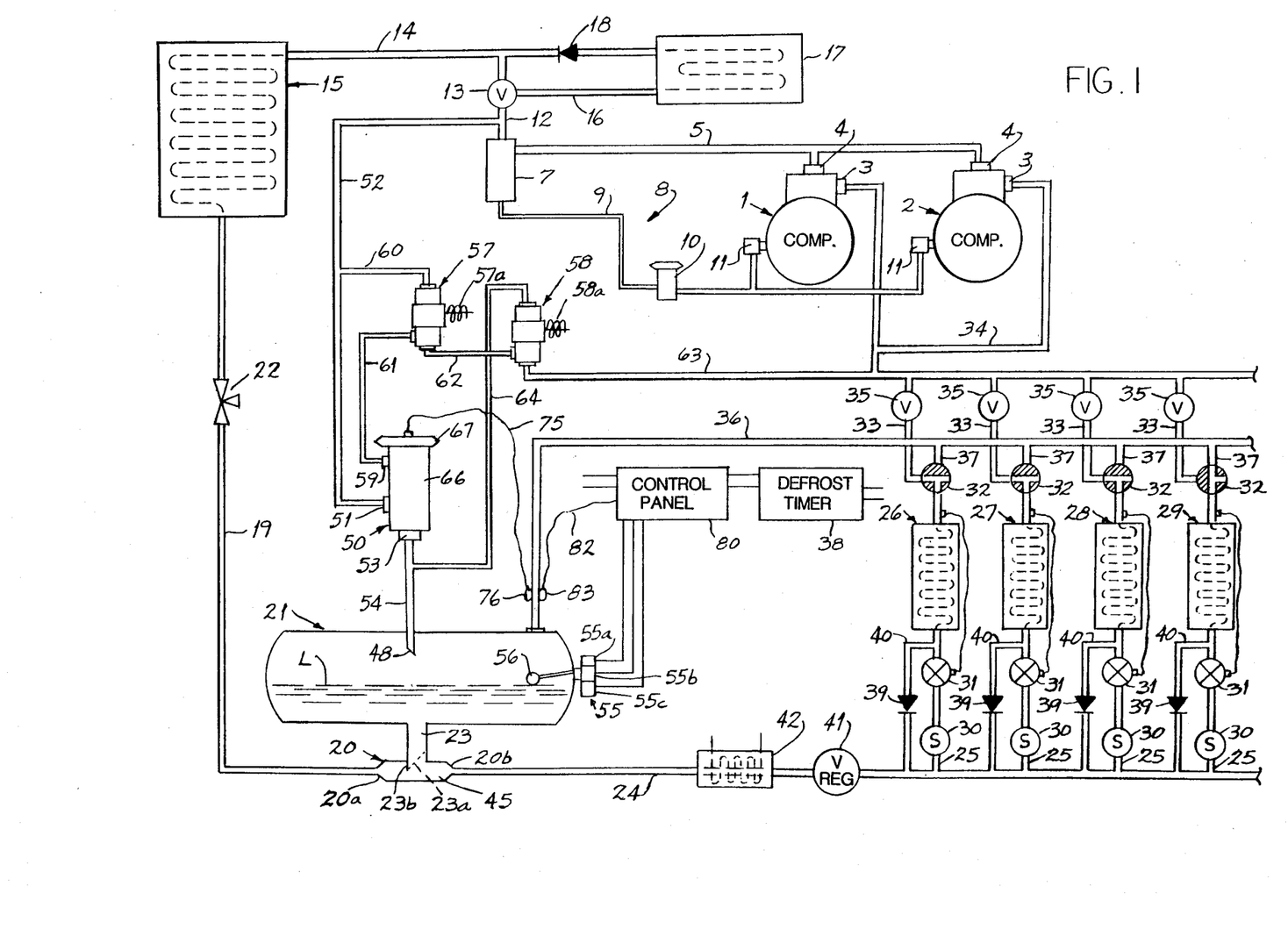
FIG. 1 is a diagrammatic view of a refrigeration system employing one embodiment of the invention.

Referring to FIG. 1, the refrigeration system shown is in part conventional and includes a pair of compressors 1 and 2 connected in parallel and each having a suction or low pressure side with a suction service valve 3 and operating within a predetermined range of suction pressures and having a discharge or high pressure side 4 connected to a common discharge header 5 through which hot compressed gaseous refrigerant is discharged for condensing operations. The discharge header 5 is connected to an oil separator and reservoir unit 7 of an oil separation system 8, in which oil is separated from the hot gaseous refrigerant in the oil separator portion and liquid oil is collected in the reservoir of the unit 7. The liquid oil is returned through an oil line 9 and pressure differential valve 10 to the oil float valves 11 of the compressors 1 and 2, as described more fully in the co-pending application Ser. No. 442,967 of DiCarlo et al for Oil Separation for Refrigeration System.

The hot refrigerant gas outlet from the oil separator 7 is connected to a high side discharge conduit 12 through which hot refrigerant vapor is conducted to a three-way valve 13 for selective operation to connect directly to conduit 14 to an outdoor or roof-top condenser 15 or through line 16 to an indoor heat reclaim condenser coil 17, which in turn is connected in series through one-way check valve 18 to the outside condenser 15 to perform the final and principal function of condensing the refrigerant to a liquid. It will be understood that the heat reclaim coil 17 is operable during the winter heating season to reclaim the superheat of compression from the refrigerant vapor for use in heating room air in the supermarket or bulding, but that the actual or final condensing temperature of the refrigerant is preferably reached in the outdoor condenser 15 to obviate refrigerant liquid and pump-out problems in the heat reclaim coil 17. U.S. Pat. No. 3,358,469 contains a fuller discussion of heat reclaim condensers and the use of back-pressure valves to maintain a minimum compressor head pressure or increase such head pressure for better heat reclamation, and also teaches a multipass condenser system for improved head pressure control and refrigerant subcooling in combination with a surge-type receiver.

The refrigerant is reduced to its condensing temperature and pressure in the condenser 15 which is connected by a conduit 19 to the inlet end 20a of an enlarged T-connection conduit or base 20 forming a part of a surge-type receiver 21 forming a liquid refrigerant source for operating the system. A pressure responsive flooding valve 22 may be provided in the conduit 19 for operation only in extreme winter conditions to restrict condensate flow from the condenser and produce variable condenser flooding and condensing capacity control to maintain a preselected minimum compressor head pressure. The outlet end 20b of the surge receiver base 20 is connected to a liquid header 24 for conducting liquid refrigerant to branch liquid lines or conduits 25 leading to evaporator coils 26, 27, 28 and 29 associated with different refrigerated fixtures or units (not shown) and being representative of numerous evaporators connected into the refrigerant system. The branch liquid line 25 of each evaporator 26, 27, 28 and 29 is provided with a solenoid valve 30, and thermostatic expansion valves 31 meter refrigerant into the evaporators in a conventional manner. The outlets of the evaporators are connected to three-way valves 32 and, under normal refrigerating operation, are connected through these valves and branch suction lines or conduits 33 to a suction header 34 connected to the suction side 3 of the compressors 1 and 2 and through which vaporous refrigerant from the evaporators is returned to the compressors to complete the basic refrigeration cycle. Evaporator pressure regulator (EPR) valves 35 are shown interposed in the branch suction lines 33 to illustrate that the suction pressure on the evaporator coils 26, 27, 28 and 29 can be adjusted so that the respective refrigerated fixtures can operate at different temperatures within the range of the suction pressures established by the compressors 1 and 2.

The refrigeration system so far described operates in a conventional manner in that each fixture evaporator absorbs heat from the unit or its product load thereby heating and vaporizing the refrigerant and resulting in the formation of frost or ice on the evaporator coils. The refrigerant gas returned to the compressor has a cumulative latent heat load in excess of the amount of heat required to defrost one or more of the evaporators 26–29. A main gas defrost header 36 is provided for conducting saturated gaseous refrigerant selectively to the evaporator coils and is connected through branch defrost lines or conduits 37 to the three-way valves 32, the three-way valve for the evaporator 29 being shown in defrost position. In a conventional "hot gas" defrost arrangement, the gas header 36 would be connected to the compressor discharge conduit 12 downstream of the oil separator and reservoir unit 7 to provide a source of highly superheated compressed refrigerant vapor for selectively defrosting the evaporators 26–29. However, a feature of the present invention is improved "saturated gas" defrosting in which the sensible and latent heat of gaseous refrigerant is used for defrosting the evaporators. Thus, the gas defrost header 36 is connected to the top of the surge receiver 21 forming a source of saturated gas above the liquid refrigerant level L therein, and typically the defrosting operation is initiated by an electrical defrost time sequencer 38 which closes the solenoid 30 and opens or reverses the three-way valve 32 to the selected evaporator 29 so that saturated gaseous refrigerant flows through the header 36, the branch line 37 and the three-way valve 32 into the evaporator coil 29 (or other selected evaporator) for heating and defrosting the coil thereby condensing the refrigerant to a liquid as in a conventional condenser. The solenoid valve 30 is closed to isolate the defrosting evaporator from its normal refrigeration connection through branch liquid line 25, and a check valve 39 is provided in by-pass line 40 around the expansion valve 31 to return the defrost condensate to the liquid line 24 so that such refrigerant is immediately available for use in the normal operation of the refrigerating evaporators. Termination of the defrost cycle can be controlled by the timer 40, or may be determined by temperature or pressure in the defrosting evaporator, as is well-known. A pressure reducing or regulating valve 41 or the like is positioned in the liquid header 24 between the branch liquid supply lines 25 and the surge receiver 21 or its flow-through T-connection base 20 to effect a downstream pressure reduction in the range of 10–20 psig in the liquid line 24 relative to the pressure in the defrost header 36, and the liquid header may also be provided with a conventional evaporative sub-cooler 42 for preventing flash gas as a result of the liquid line pressure reduction through the pressure regulator valve 41.

Those skilled in the refrigeration art will understand and appreciate the seasonal climatic influence on large commercial and industrial refrigeration systems of the type disclosed, as well as the different attributes of the several features combined according to the present invention. Obviously, the primary function of the system is to provide efficient year-round refrigeration of the respective fixtures or units cooled by the evaporator coils 26–29, and the most efficient refrigeration is obtained by delivering sub-cooled liquid refrigerant to the expansion valves 31. Such sub-cooling is obtained inherently during winter and intermediate seasons by using conventional condenser flooding or multi-pass condenser operations, as taught by U.S. Pat. No. 3,358,469, to control or maintain the minimum compressor head pressure requisite for total system operation, and the use of surge receivers enhance this sub-cooling effect. Thus, such sub-cooling can result in substantial energy or power savings unless it has to be obtained by offsetting power usage as in the operation of the sub-cooler 42, which therefore is only operated when natural sub-cooling is not otherwise obtained and then only to prevent flash gas in the liquid line 24 due to pressure reduction by valve 41 during gas defrosting and the return of defrost condensate to the liquid line 24, as taught by U.S. Pat. No. 3,150,498. Similarly, the use of heat reclaiming coil 17 will result in substantial energy or power savings during most winter and intermediate seasons depending upon the cost of electrical power for running the compressors 1 and 2 and the relative cost of the fuel which may be used for supplemental store heating. Obviously, if the operating head pressure is increased there will be an increase in the heat reclamation potential of the coil 17 but at a higher power consumption by the compressors 1 and 2.

An object of the present invention is to permit the compressor head pressure to self-adjust or "float" downwardly and still meet the efficient refrigeration needs of the fixtures or units and their product loads thereby obtaining the greatest power savings in compressor operations. The following temperature and pressure chart illustrates the minimum temperature-pressure relationship that has been obtained by the present invention during winter operations without inducing or passing refrigerant vapor or non-condensed gas into and through the liquid lines 19 and 24:

|  | Temp. | Press. R-12 | Press. R-22 | Press. R-502 |
| --- | --- | --- | --- | --- |
| Comp. Head | 77° F. | 79.8 psig | 136 psig | 154 psig |
| Condenser | 74° F. | 75.5 psig | 130 psig | 147 psig |
| Receiver | 75° F. | 76.9 psig | 132 psig | 149 psig |

This temperature-pressure relationship is an important function of the present invention, as will be described more fully.

Figure 2:
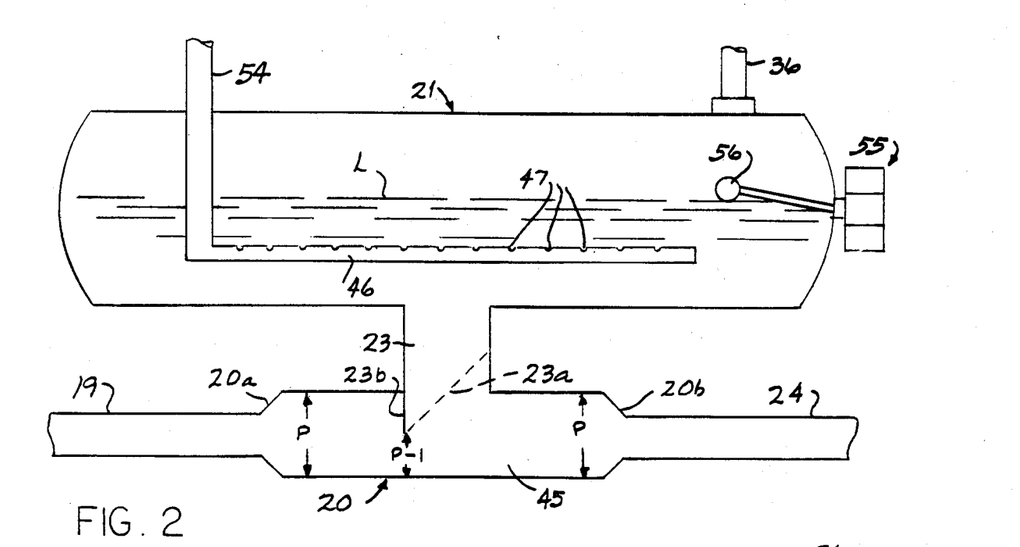
FIG. 2 is a greatly enlarged diagrammatic view of a surge receiver forming part of the invention.

Referring particularly to FIG. 2, the surge receiver 21 comprises a feature of the present invention and, together with the condenser 15, forms the high side liquid refrigerant source for the refrigerating needs of the evaporators 26–29. The large T-connection base 20 of the receiver 21 defines an enlarged horizontal leg or chamber 45 having its inlet end 20a connected to the condenser conduit 19 and its outlet end 20b connected to the liquid line 24, as previously stated, and a vertical connecting leg or column 23 connects the bottom of the surge receiver 21 in gravity flow relation to the base chamber 45. The lower end or bottom 23a of the vertical column 23 is cut or formed at a suitable upward angle or bevel such as 45°, which opens fully into or toward the base chamber outlet 20b in the downstream direction of refrigerant flow toward the liquid line 24 and the upstream or leading edge 23b of the vertical column 23 projects downwardly into the horizontal chamber and a creates a venturi by restricting the effective flow-through cross-section of the chamber 45 intermediate its ends 20a and 20b. This produces a lower pressure P-1 in the range of 0.5 to 4 psig at the point of restriction (i.e. 23b) relative to the refrigerant pressure P at the inlet and outlet ends of the base chamber 45 and enhances refrigerant flow out of the vertical column 23 of the receiver 21 and into the liquid line 24. In short, the small pressure drop immediately downstream of the leading vertical edge 23a acts as a flow ejector means to facilitate continuous flow induction from the receiver 21 into the main liquid flow through the base chamber 45 to the liquid line and thus provides for accurate and responsive refrigerant level control within the surge receiver 21.

The present system controls surge-in and surge-out liquid flow to and from the receiver 21 to maintain the liquid level within certain ranges and also maintains a predetermined receiver and liquid line pressure relationship relative to the condensing and head pressures, especially under defrosting conditions when saturated gas is being taken from the top of the receiver through defrost header 36. These functions are achieved by the operation of a surge control valve 50 (FIGS. 1 and 3) having a high side gas intake or inlet 51 connected by conduit 52 to the refrigerant discharge line 12 upstream of the heat reclaim condenser coil 17 and a gas delivery or outlet 53 connected by a receiver connection or conduit 54 to the receiver 21, and the operation of the surge control valve 50 is controlled by a networking system (to be described) through which the surge control valve 50 is responsive to different refrigerant system factors including the refrigerant liquid level L in the surge receiver 21, saturated gas defrost operations initiated by the defrost timer control 38 and modulating pressure differentials across the control valve 50. The operation of the surge control valve 50 is controlled primarily by the liquid refrigerant level L in the receiver 21, which has a float switch 55 operated by float element 56 responsive to the liquid level L. The float switch 55 has first and second switch elements 55a and 55b to be closed and effect operation of the surge control valve 50 at predetermined high and low refrigerant levels, and a third switch 55c may be provided to activate a conventional low level alarm (not shown).

In the embodiment of FIG. 1, the networking system for operation of the surge control valve 50 includes two three-way pilot solenoid valves 57 and 58 allowing the surge control valve 50 to sense receiver, discharge and suction pressures and, as stated, the control valve 50 is also responsive to defrosting operations initiated by the defrost timer 38 and to the temperature (pressure) of the defrost gas in the defrost header 36, as will appear. The solenoid valve 57 provides the direct primary operation of the surge control valve 50, and includes a discharge pressure connecting line 60 (shown connected to discharge line 52), a surge valve or equalizer line 61 connected to control inlet 59 of the surge valve 50, and a connecting line 62 to the other solenoid valve 58. The solenoid valve 58 includes, in addition to the connecting line 62 to solenoid 57, a suction pressure connecting line 63 (shown connected to the suction header 34) and a receiver pressure connecting line 64 (shown connected to receiver conduit 54). When de-energized, the solenoid valve 57 internally connects the discharge line 60 to the equalizing line 61 leading to the control inlet 59 of the surge control valve 50 and, when energized, the three-way valve 57 connects the equalizer line 61 to the valve connector line 62 to solenoid valve 58. When de-energized, the solenoid valve 58 internally connects the receiver line 64 to the valve connector line 62 and, when energized, the three-way valve connects the suction line 63 to the connector line 62. Thus, when both networking valves 57 and 58 are de-energized, the compressor discharge line 12 is connected through lines 52 and 60 and solenoid valve 57 to line 61 and the control inlet 59 of surge control valve 50 which senses the discharge head pressure; when solenoid valve 57 is energized and solenoid valve 58 is de-energized, the line 61 and control inlet 59 of surge control valve 50 sense the receiver pressure through valve 57, connector line 62, valve 58 and the receiver line 64; and when both valves 57 and 58 are energized, the control inlet 59 of surge control valve 50 senses suction pressure through valve 57, connector line 62, valve 58 and suction line 63.

Figure 3:
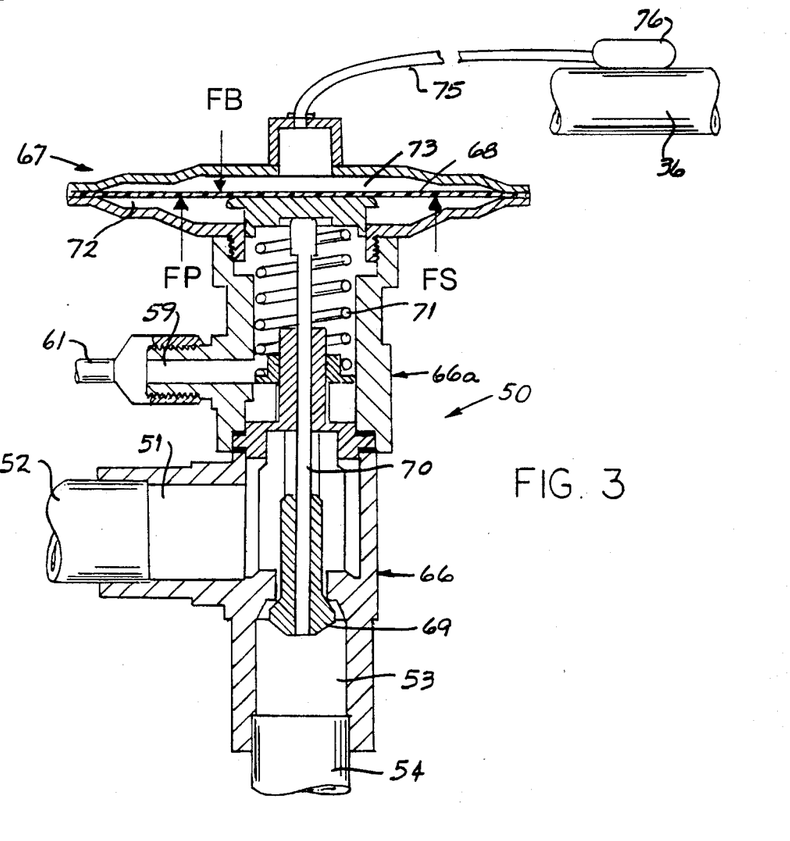
FIG. 3 is a diagrammatic cross-sectional view of a surge control valve forming part of the invention.

Referring particularly to FIG. 3, the surge control valve 50 includes a main lower body portion 66 and 66a having the discharge inlet 51 and receiver outlet 53 internally ported therein, and a control head 67 with flexible diaphragm 68 being responsive to opposed pressures to operate a valve 69 through its valve stem 70 spring-loaded by pressure spring 71. The pressure of the spring FS and the pressure FP of the equalizer or control line 61 act together in an upward direction on the diaphragm 68 in a lower chamber 72 of the control head 67 and are opposed by a gas pressure charge imposing variable pressure FB in the upper chamber 73 of the control head 67. The upper chamber 73 is connected by line 75 to the temperature sensing bulb 76 attached to the gas defrost header 36 adjacent to the surge receiver 21 to be quickly responsive to temperature-pressure changes therein, and it should be noted that pressure of the gas mixture charge varies directly with temperature so that rises in the temperature of defrost gas during defrosting operations means increasing pressures in the upper charging chamber 73 of the control head 67. Therefore, when FP plus FS are greater than FB, the valve element 69 will close communication between the discharge inlet 51 and receiver outlet 54; and when FP plus FS are smaller than FB, the surge control valve 50 will be open to establish pressure communication between discharge pressure line 52 and receiver connecting line 54.

A surge control panel 80 (FIG. 1) may be provided to house the electrical circuitry including relays, signal lights and the like for the system, and may physically house the pilot solenoid valves 57 and 58. The defrost timer 38 completes a relay circuit (not shown) upon initiating each of the respective defrost cycles of the evaporators 26-29 to energize both solenoid valves 57 and 58 whereby the control port 59 of the surge control valve 50 is connected through both valves 57 and 58 and the lines 61 and 62 to the suction line 63. This reduces the effective pressure FP acting on the diaphragm 68 and causes valve 69 to immediately and fully open pressure communication between the discharge line inlet 51 and the receiver line 54 to flow discharge gas into the receiver 21 thereby maintaining pressure for the gas defrosting operation. The control panel 80 also houses a relay thermostat (not shown) connected by line 82 to sensing bulb 83 located on the gas header manifold 36 at substantially the same location as the sensing bulb 76 for the charged upper chamber 73 of the surge control valve head member 67. The control panel thermostat is serially connected in the relay circuit of the defrost timer 38 to assure that the surge control valve 50 will be open during initial saturated gas defrosts until the temperature of the defrost gas increases to a predetermined value, such as 80° F., with a concomitant increase in the pressure FB acting on the diaphragm 68 in the upper chamber 73, at which time the open-on-rise relay thermostat opens and the surge control valve 50 is controlled by its own sensing bulb 76. It will be apparent that during saturated gas defrosting the surge control valve 50 is controlled not only by the reduced suction pressure FP effective in the lower chamber below the diaphragm 68, but by the temperature of the saturated gas in the defrost manifold 36 exerting increased pressure FB on the diaphragm 68 in the upper chamber. When the temperature control bulb 76 controls the action of the surge control valve 50 at the predetermined temperature value (i.e. 80° F.), a pressure balance or equilibrium will be established and the surge control valve 50 will modulate between open and closed positions to maintain a receiver pressure corresponding substantially to the preselected (80° F.) saturation temperature.

During gas defrost operations, the hot compressor discharge gas entering the receiver 21 effects vaporization through heat exchange of the upper level of liquid refrigerant in the receiver to keep the defrost gas take-off at a desuperheated or saturated temperature. As shown in FIG. 2, the receiver line 54 may be connected to a horizontal gas release pipe 46 having upper perforations 47 to disperse or distribute the gas throughout the receiver 21 for better heat exchange and liquid vaporization, and will effect percolation to provide a fully saturated defrost gas supply if the liquid refrigerant level is above the distribution pipe 46, as taught by U.S. Pat. No. 3,427,819. The receiver gas make-up conduit 54 in any case is preferably spaced away or remotely located relative to the connection of the gas defrost header 36 with the receiver 21, and may have a beveled end 48 (FIG. 1) directed away from such connection to maximize heat exchange and desuperheating action and obviate short circuiting of discharge gas flow from the receiver conduit discharge 48 directly to the gas defrost header 36.

As previously indicated, the surge receiver control system is primarily controlled by refrigerant level L in the receiver 21, and the upper and lower level switches 55a and 55b are connected in a relay circuit in the control panel 80 to directly control the pilot solenoid valves 57 and 58 under high and low refrigerant level actuation to effect surge-out and surge-in liquid flow in the receiver 21. The high level switch 55a is set to close at a predetermined high liquid level, such as 70%, to energize both solenoid valves 57 and 58 thereby connecting the suction line 63 to the equalizer line 61 to reduce the pressure FP acting in lower chamber 72 and open valve 69. Accordingly, discharge gas from line 52 is piped into the receiver 21 to increase the pressure therein and cause a surge-out liquid flow from the receiver into the liquid header 24 when the liquid level in receiver 21 reaches or exceeds the predetermined upper limit for switch 55a. Similarly, the low level switch 55b closes at a predetermined low liquid level, such as 20%, to deenergize both solenoids 57 and 58 whereby solenoid valve 57 connects the discharge line 52, 60 to the equalizer line 61 so that the pressure FP in the lower chamber 72 is at maximum and the valve 69 is tightly closed. Accordingly, the gas pressure in the receiver 21 will decrease to provide a surge-in liquid flow condition from the T-connection base 20 into the receiver 21.

When the liquid level L in the surge receiver 21 is between the upper and lower preselected limits of switches 55a and 55b, the solenoid valve 57 is energized and the solenoid valve 58 is de-energized to connect the equalizing line 61 to the receiver line 64 so that the surge control valve 50 will be in its modulating phase. In the modulating phase the pressure FP will be substantially the same as the receiver pressure, and the pressure FB of the gas mixture charge will correlate to the temperature sensed by sensing bulb 76. When in equilibrium or static condition, the pressure FB should be the same as the pressure FP since the receiver pressure is being sensed at both points. However, in actual operation the system is rarely static and the pressure in the receiver 21 will rise and fall more quickly than the temperature change in the sensing bulb 76 and there will be a lag time in pressure fluctuation corresponding to such temperature change. Therefore, the varying pressure differential between FP and FB will cause the valve element 69 to be in a modulating phase between open and closed positions to admit discharge gas into the surge receiver 21 toward maintenance of a substantially constant pressure differential relative to the compressor head pressure. It will be understood that the float level switch 55 overrides such normal modulating conditions to effect surge-in and surge-out liquid flow in the receiver 21 except during initial gas defrost operations when the pilot solenoid valves 57 and 58 are controlled by the time sequencer 38 and thermostat bulb 83 up to the preselected saturated gas temperature (i.e. 80° F.), as previously described.

From the foregoing, it is believed that the operation of the refrigeration system and the surge receiver control system therefor will be fully understood, and that the surge receiver control valve 50 is operated by sensing three separate pressures, i.e. receiver, discharge and suction pressure, which determine if the surge control valve is closed or modulates to an open position to allow discharge gas to flow into the receiver. If the pressure FP being sensed by the valve 50 is suction pressure, the valve will attempt to open; if the pressure FP being sensed is the discharge pressure, the valve will endeavor to close; and if the valve 50 senses receiver pressure, it will be in a modulating phase. During initial defrost operations, the timer relay and thermostatic relay control override other controls up to the selected temperature to establish discharge gas flow into the receiver 21 for defrost purposes, and above such temperature (80° F.) the surge control valve 50 goes into a modulating phase controlled by its own temperature sensor bulb 76. The surge receiver liquid level control 55 also overrides all other normal functions except the initial defrost operation up to 80° F. saturation temperature or the like, as stated. The pressure normally maintained in the operation of the surge receiver control system is below the compressor head pressure, but higher than the condensing pressure (as indicated on the temperature-pressure chart hereinbefore) thereby maintaining a minimum refrigerant liquid level in the surge receiver 21. Furthermore, temperature stratification of liquid in the surge receiver, with a warmer layer of liquid at the top and the coldest liquid at the bottom (as in the vertical column 23), enhances the subcooling of refrigerant liquid flow to the liquid line 24.

Substantial energy savings can be obtained by permitting the compressor head pressure to float downwardly to the lowest point at which system refrigeration will be efficiently provided without causing or inducing refrigerant vapor or flash gas into the liquid lines 19 and 24 and the T-connection base 20 of the surge receiver 21. It will be clear that in summer operations when the ambient is above 85° to 90° F., the condensation temperature and head pressures will be higher and little or no economic benefit can be expected. However, during winter and intermediate seasonal operations, lower head pressures alone will produce about 1% energy savings for each temperature degree of lower compressor head pressure operation, and below an ambient temperature of about 55° F. an additional 0.5% kilowatt savings will be realized by reason of subcooling. The use of heat reclaiming coil 17 in winter and intermediate seasons will also tend to lower the compressor head pressure, and may require controlled condensing capacity for optimum heat reclamation. It should also be noted that during heat reclamation the receiver liquid level may drop below the preset lower limit of 20% or the like thereby effecting surge-in control valve operation, as previously described.

Figure 4:
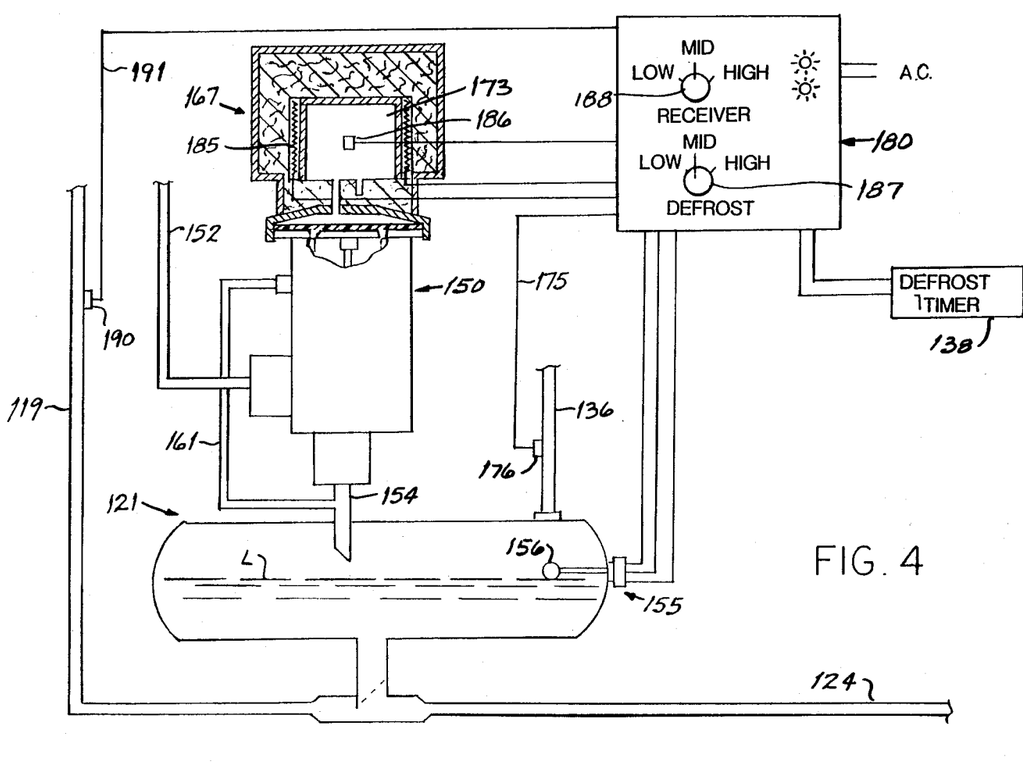
FIG. 4 is a fragmentary diagrammatic view of the refrigeration system of FIG. 1, but showing another embodiment of the invention.

Referring now to FIG. 4 in which components of the FIG. 1 system are identified in the "100" series, it will now be apparent that the electro-mechanical surge receiver control system of the FIG. 1 embodiment may be converted to an electronic pilot control, indicated generally by control panel 180, for quicker response to modulating and other conditions.

In the electronic control system (180) of FIG. 4, the surge control valve 150 is similar to the valve 50 of FIG. 1 in internal construction and porting to the compressor discharge line 152 and receiver make-up line 154 and the equalizer line 161 is connected directly to the receiver line 154 or is internally ported in the valve 150. The surge control valve 150 has an insulated control head 167 for an internal charge filled pressure chamber 173 with a strap heater element 185 or the like to be energized by saturated gas defrost operations and also during the modulating phase. The control head heater 185 is activated by a relay control operated by a temperature sensing diode 176 on the gas defrost header 136 as an electronic equivalent of the thermostatic control with sensing bulb 76 of FIG. 1. A temperature sensor 186 is provided in the chamber 173 to electronically correlate the pressure FB with the receiver pressure sensed through line 136. Thus, the pressure charge FB imposed in the control head 167 will be increased to a maximum directly by the heater 185 to keep the valve 150 open on initial defrost, and the heater 185 will then be activated intermittently to effect modulating conditions of the control valve 150 when the saturation temperature of the defrost gas reaches a predetermined saturation value. The switch 187 on the control panel 180 permits adjustment of the saturation value.

The liquid level float head 156 of the FIG. 4 embodiment is adapted to operate a modified level control sensor means utilizing a slide wire rheostat 155 in lieu of the high and low level switches 55a and 55b of the FIG. 1 embodiment. The rheostat 155 operates from an adjustable set point indicated by the switch 188 on the control panel 180 to establish a predetermined liquid level or median range so that the rise and fall of liquid levels from such median are sensed and modulating valve action is normally effected by the heater 185 in response to receiver pressure and the temperature diode sensor 176 similar to the thermostatic control from bulb 76 as in the FIG. 1 embodiment. In addition to operating the surge control valve 150 in response to liquid levels L in the surge receiver 121, during gas defrost operations and under modulating conditions, the switch 188 of the electronic pilot control 180 provides adjustment so that the control valve 150 will be responsive to seasonal changes in liquid levels L. It is recognized that the summer loading of the surge receiver 121 will be greater than during the winter season, and therefore the electronic pilot control 180 includes a temperature sensing diode 190 located on the condenser discharge line 119 connected by line 191 to affect the adjustable set point of the switch 188 and operate the heater 185 to thereby adjust or modify the hysteresis of the liquid level modulation median by a compensating factor of 10% or the like. In other words, the diode 190 permits the receiver loading to be increased by a compensating factor of about 10% over the normal set point established by the switch 188 during summer operations when receiver liquid levels are known to be higher.

It will be readily apparent to those skilled in the art that other changes and modifications of the present invention can be made, and the scope of the invention is only to be limited by the claims which follow.

What is claimed is:

1. A surge receiver control system for a multiple compressor refrigeration system having condenser means, a liquid header, a surge receiver in open refrigerant flow communication with said liquid header, branch liquid lines connecting multiple evaporators to said liquid line downstream of said surge receiver for refrigeration operations, and gas defrost means for selectively defrosting said evaporators; comprising a surge control valve disposed between the discharge side of the multiple compressors and said surge receiver in by-pass relation to said condenser means, said surge control valve including first means forming a closed pressure charge acting on said control valve in one direction to bias said valve toward an open position to establish fluid pressure communication between said compressors and said surge receiver, said first means being opposed by receiver pressure acting in the opposite directon for opening and closing said control valve in a modulating mode in response to a predetermined pressure differential thereacross, and said gas defrost means including second means for operating said surge control valve in a defrost mode different from said pressure differential in response to gas defrosting operations.

2. The surge receiver control system according to claim 1, including third means for operating said surge control valve in response to varying liquid refrigerant levels in said surge receiver.

3. The surge receiver control system according to claim 2, in which said third means comprises liquid level sensing means in said surge receiver, and electric means responsive to said liquid level sensing means for accommodating the modulating mode of surge control valve operation at a preselected liquid level median.

4. The surge receiver control system according to claim 3, in which said electric means comprises a constant monitoring device having a preselected set point for establishing said liquid level median.

5. The surge receiver control system according to claim 4, in which said constant monitoring device is adapted to effect surge control valve operations in a liquid level control mode in response to deviations from the value of said liquid level median.

6. The surge receiver control system according to claim 5, in which said constant monitoring device comprises a slide-wire rheostat having an adjustable set point to acommodate normal liquid level median changes due to seasonal refrigerant requirements of the refrigeration system.

7. The surge receiver control system according to claim 4, including temperature sensing means responsive to condenser discharge temperatures for establishing a modified liquid level median set point for the modulating mode of said surge control valve.

8. The surge receiver control system according to claim 3, in which said electric means comprises first and second switch means adapted to be closed in response to predetermined high and low liquid levels in said surge receiver for surge control valve operations in a liquid flow control mode to effect surge-out and surge-in liquid flow in said surge receiver.

9. The surge receiver control system according to claim 1, in which said surge receiver of said refrigeration system comprises a main receiver tank and gravity flow T-connection base forming a liquid refrigerant source, said T-connection base having a vertical column and horizontal base chamber, and flow ejector means for inducing liquid refrigerant flow from said main receiver tank into said base chamber of said T-connection base.

10. The surge receiver control system according to claim 9, in which said flow ejector means comprises venturi means located at the juncture of said vertical column and base chamber for creating a minimal pressure drop in said base chamber.

11. The surge receiver control system according to claim 10, in which said base chamber has an upstream inlet end with conduit connection means to said condenser means and a downstream outlet end connected by a liquid header means to said evaporators, and said vertical column having a wall portion projecting into said horizontal base chamber on the upstream side thereof to form said venturi means.

12. The surge receiver control system according to claim 11, in which the wall portion of said vertical column has an angularly formed lower edge extending upwardly from said upstream side whereby the vertical column opens fully into said base chamber in a downstream refrigerant flow direction toward said outlet end.

13. The surge receiver control system according to claim 1, in which said surge receiver forms a source of saturated gas, said second means being adapted to operate said surge control valve during gas defrost operations to supply gaseous refrigerant from the discharge of said compressors to said surge receiver, and means for desuperheating the discharge gas in said surge receiver for use in gas defrosting operations.

14. The surge receiver control system according to claim 13, in which said last said means comprises a perforated horizontal gas ejector extending longitudinally of said surge receiver and normally being disposed below the liquid level therein.

15. The surge receiver control system according to claims 1, 2 or 9, in which said gas defrost means utilizes a source of saturated gas as the defrosting medium in defrosting said evapoarators, and said second means comprising electrical timer means for selectively connecting the evaporators to said saturated gas source and being adapted for operating said surge control valve in said defrost mode.

16. The surge receiver control system according to claim 15, in which said surge receiver comprises the saturated gas source, and said surge control valve being actuated in said defrost mode by said timer means during the initial period of each gas defrosting operation.

17. The surge receiver control system according to claim 16, in which said timer means substantially simultaneously initiates a gas defrosting operation and actuates said surge control valve to an open position to establish pressure communication between said compressor discharge side and said surge receiver.

18. The surge receiver control system according to claim 17, in which said second means includes temperature sensing means for maintaining said surge control valve in an open position during gas defrosting operations after actuation by said timer means and until a predetermined saturation temperature is sensed.

19. The surge receiver control system according to claim 18, in which said temperature sensing means comprises an open-on-rise thermostat and sensing bulb therefor.

20. The surge receiver control system according to claim 19, in which said gas defrosting means includes a gas header connected to the top of said surge receiver, and said temperature sensing means is located on said gas header adjacent to said surge receiver.

21. The surge receiver control system according to claim 18, in which said temperature sensing means comprises a diode controlled electrical circuit.

22. The surge receiver control system according to claim 21, in which said gas defrosting means includes a gas header connected to the top of said surge receiver, and said temperature sensing means is located on said gas header adjacent to said surge receiver.

23. The surge receiver control system according to claim 2, in which said surge control valve includes a high pressure inlet in fluid communication with the discharge side of said multiple compressors, a valve outlet in fluid communication with said surge receiver, a valve member for controlling fluid communication between said high pressure inlet and said valve outlet, and valve actuating means for operating said valve member between a normally closed position and an open position establishing said fluid communication between said high pressure inlet and said valve outlet.

24. The surge receiver control system according to claim 23, in which said valve actuating means is pressure responsive and includes spring pressure means biasing said valve member toward its normally closed position, control inlet means in fluid pressure communication with said refrigeration system for exerting variable system pressures additive to said spring pressure means, and said pressure fluid charge of said first means acting in opposition to the combined forces of said spring pressure means and fluid pressure in said control inlet means toward the actuation of said valve member to its open position.

25. The surge receiver control system according to claim 24, in which said first means includes pilot control means for normally operating said surge control valve in said modulating mode toward maintenance of a predetermined pressure differential in said surge receiver relative to the discharge pressure of said multiple compressors.

26. The surge receiver control system according to claim 25, in which said control inlet means is connected to said valve outlet whereby the fluid pressure of said surge receiver is additive to said spring pressure means, and said pilot control means comprises electronic control means for adjusting the pressure exerted by the pressure fluid charge.

27. The surge receiver control system according to claim 26, in which said electronic control means includes heater means for said pressure fluid charge, sensor means for sensing the temperature-pressure relationship prevailing in said surge receiver, and means responsive to said sensor means for activation of said heater means for operating said surge control valve to maintain a substantially constant pressure differential in said surge receiver relative to the compressor discharge pressure during the modulating mode.

28. The surge receiver control system according to claim 27, in which said heater means of said electronic control means is activated by said second means during an initial portion of each gas defrosting operation to increase the force of said pressure fluid charge and open said valve member in the defrost mode of said surge control valve.

29. The surge receiver control system according to claim 28, in which said means responsive to said sensor means is adapted to regulate said heater means at a preselected saturation temperature to override said second means and establish a second modulating mode of surge control valve operation at substantially said saturation temperature during the terminal portion of a gas defrost operation.

30. The surge receiver control system according to claim 25, in which said pilot control means comprises solenoid valve means adapted to connect said control inlet means of said surge control valve to the valve outlet thereof whereby the pressure of said surge receiver is additive to said spring pressure means during said modulating mode of said surge control valve, and said second means being adapted to energize said solenoid valve means to connect said control inlet means to the suction side of the multiple compressors to reduce the valve closing force exerted on said valve member and thereby open said surge control valve during an initial portion of each gas defrosting operation.

31. The surge receiver control system according to claim 30, including sensor means for sensing the temperature-pressure relationship prevailing in said surge receiver, and said pressure fluid charge being responsive to a preselected saturation temperature sensed by said sensor means to override said second means and establish a second modulating mode of surge control valve operation at substantially said saturation temperature during the terminal portion of each gas defrosting operation.

32. The surge receiver control system according to claim 24, in which said first means comprises pilot control means including a first three-way solenoid valve having an outlet port connected to said control inlet means, a high pressure inlet port connecting the discharge side of said compressors to said outlet port in the de-energized state of said first solenoid valve, and an equalizing inlet port connecting with the outlet port in the energized state of said first solenoid valve, and means for selectively connecting said equalizing inlet port to said surge receiver and to the suction side of said compressors.

33. The surge receiver control system according to claim 32, in which said last-mentioned means comprises a second three-way solenoid valve having an outlet port connected to the equalizing port of said first valve, a receiver inlet port connecting the surge receiver to said first valve in the de-energized state of said second valve, and a suction inlet port connecting the suction side of said compressors to said first valve in the energized state of said second valve.

34. In a refrigeration system having compressor means, condenser means, surge receiver means and multiple evaporator means; said condenser means and evaporator means being connected by a liquid refrigerant line and said surge receiver means having a main liquid refrigerant tank connected in open gravity flow relation above a portion of said liquid line; and gas defrost means connected to said receiver means for taking refrigerant gas therefrom to selectively defrost said evaporator means; the improvement comprising high side control means for said refrigeration system including a surge control valve having a high pressure gas inlet connected to the discharge side of said compressor means and a valve outlet connected to said surge receiver means, first means for operating said surge control valve in a modulating mode toward maintaining a substantially constant predetermined pressure differential between the compressor discharge side and said surge receiver, second means for operating said surge control valve in a defrost mode during gas defrosting operations, and third means responsive to the level of liquid refrigerant in said surge receiver means for operating said surge control valve to regulate the pressure within said surge receiver means.

35. The refrigeration system according to claim 34, in which said third means operates said surge control valve in a liquid flow control mode in response to liquid levels at variance with a preselected median in said surge receiver means.

36. The refrigeration system according to claim 34, in which said first means normally operates said surge control valve to maintain the refrigerant pressure in said surge receiver means lower than the discharge side pressure of said compressor means and greater than the condensing pressure in said condensing means.

* * * * *